(12) United States Patent
Li et al.

(10) Patent No.: US 12,097,884 B2
(45) Date of Patent: Sep. 24, 2024

(54) LANE CHANGE MONITORING METHOD AND LANE CHANGE MONITORING SYSTEM FOR AUTONOMOUS VEHICLE

(71) Applicant: Institute of Automation Shandong Academy of Sciences, Jinan (CN)

(72) Inventors: Yanqiang Li, Jinan (CN); Hongyun Chen, Jinan (CN)

(73) Assignee: INSTITUTE OF AUTOMATION SHANDONG ACADEMY OF SCIENCES, Jinan (CN)

( * ) Notice: Subject to any disclaimer, the term of this patent is extended or adjusted under 35 U.S.C. 154(b) by 376 days.

(21) Appl. No.: 17/423,100

(22) PCT Filed: May 15, 2020

(86) PCT No.: PCT/CN2020/090585
§ 371 (c)(1),
(2) Date: Jul. 14, 2021

(87) PCT Pub. No.: WO2020/253428
PCT Pub. Date: Dec. 24, 2020

(65) Prior Publication Data
US 2022/0126871 A1    Apr. 28, 2022

(30) Foreign Application Priority Data
Jun. 19, 2019    (CN) .......................... 201910532954.X

(51) Int. Cl.
*B60W 60/00*    (2020.01)

(52) U.S. Cl.
CPC .... *B60W 60/0017* (2020.02); *B60W 60/0016* (2020.02); *B60W 2554/4041* (2020.02);
(Continued)

(58) Field of Classification Search
None
See application file for complete search history.

(56) References Cited

U.S. PATENT DOCUMENTS

| | | | |
|---|---|---|---|
| 10,996,141 B2 * | 5/2021 | Anderson | B60W 40/08 |
| 2020/0189608 A1 * | 6/2020 | Braley | B60W 50/029 |

OTHER PUBLICATIONS

Machine translation of Liu et al ( CN 106706341 A) (Year: 2017).*
(Continued)

*Primary Examiner* — James J Lee
*Assistant Examiner* — David Hatch
(74) *Attorney, Agent, or Firm* — JCIPRNET

(57) ABSTRACT

The present invention provides an autonomous vehicle lane change monitoring method and lane change monitoring system, wherein the lane change monitoring system comprises at least a reference vehicle, a test road, a network communication device, and a control platform, wherein the reference vehicle and the to-be-tested vehicle traveling on the test road, wherein the control platform sends a control instruction to the reference vehicle and the to-be-tested vehicle through the network communication device for the to-be-tested vehicle to change lane on the test road when appropriate, the driving data of the to-be-tested vehicle is transmitted to the control platform through the network communication device, so as for the control platform to evaluate the lane change performance of the to-be-tested vehicle based on the driving data.

14 Claims, 12 Drawing Sheets

(52) U.S. Cl.
CPC .............. *B60W 2554/4045* (2020.02); *B60W 2554/4049* (2020.02)

(56) References Cited

OTHER PUBLICATIONS

Osha—Reference Guide to Work one Traffic Control (Year: 2011).*
Map of Mcity autonomous driving test center (Year: 2019).*
"U.S. Department of Transportation, Federal Highway Administration, United States Pavement Markings (2002)" (Year: 2002).*

* cited by examiner

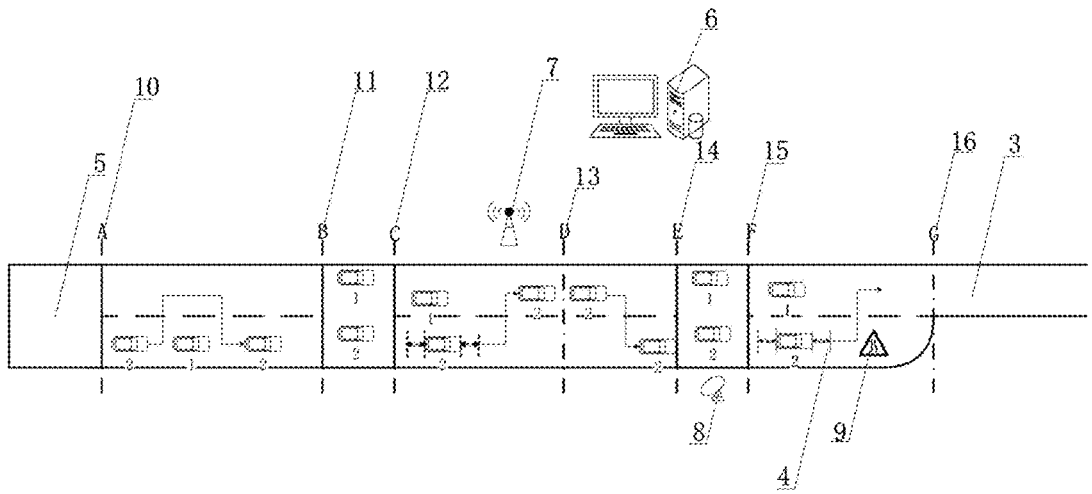

FIG.5

| Driving both the reference vehicle and the to-be-tested vehicle into the preparation area, checking wireless network connections between the reference vehicle and the control platform and between the reference vehicle and the to-be-tested vehicle |

↓

| Driving the reference vehicle to leave the preparation area and travel on the second lane at the speed of v1 and when traveling smoothly, having the control platform to issue a test start instruction, wherein when the reference vehicle passes the first single purpose test start warning line, it is regarded as the start of the test, wherein the to-be-tested vehicle drives out from the preparation area at the speed of v2 on the second lane in an automatic driving mode and approaches the reference vehicle, wherein v2>v1, wherein the to-be-tested vehicle performs an overtaking action when appropriate |

↓

| Collecting the interval, the speed, and the turn-light operation condition of the to-be-tested vehicle and the reference vehicle in real time through the wireless communication unit and analyzing whether the overtaking of the to-be-tested vehicle is qualified according to the collected data by the control platform |

↓

| The qualification criteria of the overtaking test are specifically: the turn light operations of the to-be-tested vehicle are correct during the overtaking process, the operation is completed before the first single purpose test end warning line, the driving of the reference vehicle is not affected and no collision occurs, and stays driving in the middle of the lane after the overtaking action |

FIG.6 after the overtaking test is finished, driving both the to-be-tested vehicle and the reference vehicle into the first adjustment area to change the vehicle posture for the occupancy lane change test

↓ after the to-be-tested vehicle and the reference vehicle enter the first adjusting area, wherein the two vehicles are kept in a side-by-side state, the reference vehicle is located in the first lane and the to-be-tested vehicle is located in the second lane, wherein the reference vehicle is first driven out at the speed of v3 and then the to-be-tested vehicle is driven out at the speed of v3, wherein it has to be ensured that the reference vehicle keep a distance of at least 3 meters from the front or back of the to-be-tested vehicle

↓ the test begins when the reference vehicle passes a second single purpose test start warning line, wherein the to-be-tested vehicle smoothly switches from the second lane to the front of the first reference vehicle in the first lane

↓ collecting the interval, the speed, and the turn-light operation condition of the to-be-tested vehicle and the reference vehicle in real time through the wireless communication unit and analyzing whether the occupancy lane changing of the to-be-tested vehicle is qualified according to the collected data by the control platform

↓ the qualification criteria of the occupancy lane change test are specifically: the normal traveling of the reference vehicle is not affected and no collision occurs, the directions and durations of the turn-light are correct, and the operation succeeds before the start-end dual purpose warning line

FIG. 7

--- the reference vehicle keeps traveling at a speed in a first lane until entering a second adjustment zone and the to-be-tested vehicle continues to travel in the middle of the first lane at a speed

↓ when the pull-over parking test begins and when the to-be-tested vehicle crosses the start-end dual purpose warning line, the to-be-tested vehicle changes lane back to the second lane from the first lane and travels at a constant speed along the second lane at the speed of v4, the control platform sends a pull-over parking instruction to the to-be-tested vehicle when appropriate, and the to-be-tested vehicle completes the pull-over parking operation before the second single purpose test end warning line by itself when appropriate

↓ the control platform collects the speed, the turn-light operation conditions, and the parking distance from the roadside of the to-be-tested vehicle in real time through the wireless communication unit and analyzes whether the to-be-tested vehicle is qualified or not according to the collected data

↓ the qualification criteria of the pull-over parking test are specifically: the direction and duration of the vehicle turn-light are correct, the entire vehicle is in the emergency lane, the warning lights can be correctly turned on after entering the emergency lane, the parked vehicle is parallel to the right lane, the operation is completed before the second single purpose test end warning line, the maximum distance is less than or equal to 50 centimeters, and the parking actions are coherent

FIG. 8 after the pull-over parking test is finished, driving both the to-be-tested vehicle and the reference vehicle into the second adjustment area to change the vehicle posture for the lane reduction lane change test

↓ after the to-be-tested vehicle and the reference vehicle enter the second adjusting area, wherein the two vehicles are kept in a side-by-side state, the reference vehicle is located in the first lane and the to-be-tested vehicle is located in the second lane, wherein the reference vehicle is first driven out at the speed of v5 and then the to-be-tested vehicle is driven out at the speed of v5, wherein it has to be ensured that the reference vehicle keep a distance of at least 3 meters from the front or back of the to-be-tested vehicle

↓ when the reference vehicle crosses the third single purpose test start warning line, the test starts, wherein the reference vehicle and the to-be-tested vehicle reach the speed of v5 before a predetermined distance from the lane reduction sign, wherein the to-be-tested vehicle should switch to the first lane in the automatic driving mode before the lane is actually reduced

↓ collecting the interval, the speed, and the turn-light operation condition of the to-be-tested vehicle and the reference vehicle in real time through the wireless communication unit and analyzing whether the lane reduction merging test of the to-be-tested vehicle is qualified according to the collected data by the control platform

↓ the qualification criteria of the lane reduction lane change test are specifically: the direction and duration of the vehicle turn-light are correct, the lane change is completed whether by means of deceleration or acceleration, no collision with the first reference vehicle or affecting the normal driving thereof, and the operation is completed before the third single purpose test end warning line

FIG. 9 communicatively connecting the to-be-tested vehicle 100A with a reference vehicle 30A, and communicatively connecting the to-be-tested vehicle 100A with a network communication device 40A, so that the network communication device 40A receives driving data of the reference vehicle 30A and the to-be-tested vehicle 100A, and sends a control instruction of a control platform 20A to the to-be-tested vehicle 100A and the reference vehicle 30A sending a lane change control instruction to the to-be-tested vehicle 100A, wherein the reference vehicle 30A the reference vehicle 30A is driven on a first lane 11A of the test road based on the control instruction of the control platform 20A for the to-be-tested vehicle 100A to change lane, when appropriate, on a second lane 12A and the first lane 11A of the test road 10A based on the lane change control instruction collecting the interval, the speed and the turn-light operation condition of the to-be-tested vehicle 100A and said reference vehicle 30A, and analyzing the lane change performance of the to-be-tested vehicle 100A

FIG.13

LANE CHANGE MONITORING METHOD AND LANE CHANGE MONITORING SYSTEM FOR AUTONOMOUS VEHICLE

BACKGROUND OF THE PRESENT INVENTION

Field of Invention

The present invention relates to the field of autonomous driving, and more particularly, to a lane change monitoring method and lane change monitoring system for autonomous vehicle.

Description of Related Arts

The automatic driving technology is divided into a plurality of grades. At present, domestic and international industries often adopt classification standards made by the Society of Automotive Engineers (SAE) and the National Highway Traffic Safety Administration (NHTSA) of the US. According to the standard of SAE, autonomous vehicles are classified into six grades based on their smartness and automaticity: no automation (L0), driver assistance (L1), partial automation (L2), conditional automation (L3), high automation (L4), and full automation (L5).

At the present stage, domestic and international researches on automatic driving have gradually gone deep, and continuously developed from assisted driving to unmanned driving. An autonomous vehicle, regardless of the developing stage thereof, needs a test result of its performance for validating or improving its security.

Here, the capability of the autonomous vehicle lane change is particularly important, wherein there is theory of lane change capability of autonomous vehicle, but the actual development thereof is not mature yet, which requires continuously testing to be validated and completed. However, it currently lacks standard testing methods for autonomous vehicle lane change capability in a somehow real driving environment. Conventional automatic driving vehicle lane change tests are mostly theoretical simulation test, which means that they are mostly virtual test data simulations through computers by vehicle manufacturers. Such test data may not be able to fully conform to the driving environment on an actual road surface scenario. In other words, conventional lane change tests of the autonomous vehicle are difficult to simulate a real road driving environment. For the test results obtained by these existing test systems and test methods are difficult to be close to the real test results.

On the other hand, if the autonomous vehicle performs vehicle performance test on a real road, the test method can reveal a true test result, but once the vehicle to be tested fails or does not meet the driving standards, traffic accidents are likely to occur. That is, autonomous vehicles have a relatively great security risk in driving on a real road.

Therefore, there is a need for a test method that can be standard for automatic driving lane change capability and be close to a real driving environment test.

SUMMARY OF THE PRESENT INVENTION

A main advantage of the present invention is to provide an autonomous vehicle lane change monitoring method and lane change monitoring system, wherein the lane change monitoring system sets a real driving environment, so as to test the lane change performance of the autonomous vehicle to be tested in close proximity to the real road condition.

Another advantage of the present invention is to provide an autonomous vehicle lane change monitoring method and lane change monitoring system, wherein the lane change monitoring system sets a real driving environment for the autonomous vehicle to be tested to conduct overtaking, adjacent lane occupancy merging, pull-over parking, and lane reduction merging tests, so as to test the lane change performance of the autonomous vehicle to be tested in a condition close to the real road condition.

Another advantage of the present invention is to provide an autonomous vehicle lane change monitoring method and lane change monitoring system, wherein the autonomous vehicle lane change monitoring method sets a real driving environment for the autonomous vehicle to be tested to continuously conduct overtaking, adjacent lane occupancy merging, pull-over parking, and lane reduction merging tests, so as to test the lane change performance of the autonomous vehicle to be tested in a condition close to the real road condition.

Another advantage of the present invention is to provide an autonomous vehicle lane change monitoring method and lane change monitoring system, wherein the automatic driving vehicle lane change monitoring method combines all possible scenes on actual roads with respect to lane change performance, including overtaking test, occupancy lane change test, pull-over parking test, and lane reduction lane change test, so that the test is more efficient and coherent, and the test system can be utilized as a standardized scene for testing different autonomous vehicles, so that the testing result can be more prestigious and reliable.

Another advantage of the present invention is to provide an autonomous vehicle lane change monitoring method and lane change monitoring system, wherein the lane change monitoring system is closer to the real driving environment than theoretical data of the computer simulated traffic operation software, so that the testing result can more accurately represent the performance of the lane change of the to-be-tested vehicle.

Another advantage of the present invention is to provide an autonomous vehicle lane change monitoring method and lane change monitoring system, wherein the real driving environment set by the lane change monitoring system is more secure with respect to an actual road for test.

Another advantage of the present invention is to provide an autonomous vehicle lane change monitoring method and lane change monitoring system, wherein the autonomous vehicle lane change monitoring method test method combines all possible scenarios on the actual road with respect to lane change abilities, making the test more efficient and more coherent.

Another advantage of the present invention is to provide an autonomous vehicle lane change monitoring method and lane change monitoring system, wherein the test field of the lane change monitoring system can be utilized as a standardized scene for test usage of different autonomous vehicles, so that the test result is more prestigious and reliable.

In order for solving the drawbacks of the prior art, the present disclosure provides a test road, system, and method for lane change performance of autonomous vehicle. Contrasting to the theoretical data of computer simulation traffic operation software, the system is closer to the real driving environment, so that the test results thereof can more accurately represent the performance of the to-be-tested vehicle, and the tests are safer with respect the practices on actual roads.

Other advantages and features of the present invention are fully apparent from the following detailed description, and may be realized by means of the instrumentalities and combinations particularly pointed out in the appended claims.

According to an aspect of the present invention, a lane change monitoring system provided by the present invention is capable of achieving the above and other objects and advantages, wherein the lane change monitoring system is adapted for testing a to-be-tested vehicle and comprises:

at least a reference vehicle, adapted to be communicatively connected with the to-be-tested vehicle;

a test road for the reference vehicle and the to-be-tested vehicle to travel thereon;

a network communication device, wherein the reference vehicle is communicatively connected with the network communication device, wherein the network communication device is adapted to be communicatively connected with the test vehicle; and a control platform, wherein the control platform is communicatively connected with the network communication device, wherein the control platform sends a control instruction to the reference vehicle and the to-be-tested vehicle through the network communication device for the to-be-tested vehicle to change lane on the test road channel when appropriate, wherein the driving data of the to-be-tested vehicle is transmitted to the control platform through the network communication device, so as for the control platform to evaluate the lane change performance of the to-be-tested vehicle based on the driving data.

According to another aspect of the present invention, the present invention further provides a lane change monitoring method for autonomous vehicle, adapted for testing lane change performance of a to-be-tested vehicle, comprising the following steps:

(a) communicatively connecting the to-be-tested vehicle with a reference vehicle, and communicatively connecting the to-be-tested vehicle with a network communication device, so that the network communication device receives driving data of the reference vehicle and the to-be-tested vehicle, and sends a control instruction of a control platform to the to-be-tested vehicle and the reference vehicle;

(b) sending a lane change control instruction to the to-be-tested vehicle, wherein the reference vehicle the reference vehicle is driven on a first lane of the test road based on the control instruction of the control platform for the to-be-tested vehicle to change lane, when appropriate, on a second lane and the first lane of the test road based on the lane change control instruction; and (c) collecting the interval, the speed and the turn-light operation condition of the to-be-tested vehicle and the reference vehicle, and analyzing the lane change performance of the to-be-tested vehicle.

In order to achieve the above objects, the present invention provides the following technical solutions:

In a first aspect, the present disclosure provides a test road for lane change performance of autonomous vehicle.

A test road for lane change performance of autonomous vehicle comprises at least two lanes, each having a plurality of test warning lines arranged thereon, at least including three single purpose test start warning lines, three single purpose test end warning lines, and a start-end dual purpose warning line, wherein at least one of the lanes has a lane reduction scene arranged thereon; the initial stage of the lane has a preparation area for checking the conditions of the vehicle and making a good test preparation; the lane has at least two adjusting areas on the middle section thereof for the vehicle after the finish of the test to drive into, to adjust the condition of the vehicle, and to change and maintain the vehicle condition required by the next test.

In a second aspect, the present disclosure provides a test system for lane change performance of autonomous vehicle.

A test system for autonomous vehicle lane change capabilities includes at least one reference vehicle, at least one to-be-tested vehicle, a control platform, roadside devices, and test roads as described herein, wherein the roadside devices comprises a wireless communication unit and a laser range finder arranged by the roadside, wherein the wireless communication unit is communicatingly connected with the laser range finder, the reference vehicle, and the to-be-tested vehicle, so as for transmitting the driving state data of the reference vehicle and the to-be-tested vehicle and the distance data of the to-be-tested vehicle and the roadside to the control platform, wherein the control platform is utilized for controlling the driving state of the reference vehicle and the to-be-tested vehicle, and analyzing whether the lane change capability test of the to-be-tested vehicle is qualified or not according to the received data.

As a further limitation, the control platform is also utilized to control the speed and lateral position of the reference vehicle in front of or side-by-side of the to-be-tested vehicle.

As a further limitation, the lane at least has an overtaking test area, a merging test area, a parking test area, and a lane reduction lane change area arranged thereon, wherein the laser range finder is arranged at the roadside of the parking test area and utilized for detecting the distance from the roadside to to-be-tested vehicle when it parks.

As a further limitation, the reference vehicle and the to-be-tested vehicle are each equipped with a wireless communication device employing a V2X communication protocol, for realizing communication between the vehicles, between the vehicle and the control platform, and sending early warning information to the to-be-tested vehicle when the reference vehicle changes the vehicle speed and/or the driving direction to be close to the to-be-tested vehicle, and also being utilized for transmitting the posture, the speed, the trajectory, and time and durations of the on and off and flashing of the turn-light of the to-be-tested vehicle to the control platform.

As a further limitation, the wireless communication unit is a V2X wireless communication network roadside unit (RSU);

As a further limitation, the to-be-tested vehicle is equipped with a differential GPS plus inertial guidance navigation device for transmitting the whole-course trajectory information of the to-be-tested vehicle to the wireless communication unit via a wireless communication protocol to be uploaded to the control platform.

In a third aspect, the present disclosure provides a test method for lane change performance of autonomous vehicle.

A test method for lane change performance of autonomous vehicle comprises the following steps:

driving both the reference vehicle and the to-be-tested vehicle into the preparation area, checking wireless network connections between the reference vehicle and the control platform and between the reference vehicle and the to-be-tested vehicle;

driving the reference vehicle to leave the preparation area and travel on the second lane at the speed of v1 and when traveling smoothly, having the control platform to issue a test start instruction, wherein when the reference vehicle passes the first single purpose test start warning line, it is regarded as the start of the test, wherein the to-be-tested vehicle drives out from the preparation area at the speed of v2 on the second lane in an automatic driving mode and approaches the reference vehicle, wherein v2>v1, wherein the to-be-tested vehicle performs an overtaking action when appropriate; and collecting the interval, the speed, and the turn-light operation condition of the to-be-tested vehicle and the reference vehicle in real time through the wireless communication unit and analyzing whether the overtaking of the to-be-tested vehicle is qualified according to the collected data by the control platform;

wherein the qualification criteria of the overtaking test are specifically: the turn-light operations of the to-be-tested vehicle are correct during the overtaking process, the operation is completed before the first single purpose test end warning line, the driving of the reference vehicle is not affected and no collision occurs, and stays driving in the middle of the lane after the overtaking action.

As a further limitation, after the overtaking test is finished, driving both the to-be-tested vehicle and the reference vehicle into the first adjustment area to change the vehicle posture for the occupancy lane change test;

after the to-be-tested vehicle and the reference vehicle enter the first adjusting area, wherein the two vehicles are kept in a side-by-side state, the reference vehicle is located in the first lane and the to-be-tested vehicle is located in the second lane, wherein the reference vehicle is first driven out at the speed of v3 and then the to-be-tested vehicle is driven out at the speed of v3, wherein it has to be ensured that the reference vehicle keep a distance of at least 3 meters from the front or back of the to-be-tested vehicle;

the test begins when the reference vehicle passes a second single purpose test start warning line, wherein the to-be-tested vehicle smoothly switches from the second lane to the front of the first reference vehicle in the first lane;

collecting the interval, the speed, and the turn-light operation condition of the to-be-tested vehicle and the reference vehicle in real time through the wireless communication unit and analyzing whether the merging of the to-be-tested vehicle is qualified according to the collected data by the control platform;

the qualification criteria of the occupancy lane change test are specifically: the normal traveling of the reference vehicle is not affected and no collision occurs, the directions and durations of the turn-light are correct, and the operation succeeds before the start-end dual purpose warning line.

As a further limitation, the reference vehicle keeps traveling at a speed of v3 in a first lane until entering a second adjustment zone and the to-be-tested vehicle continues to travel in the middle of the first lane at a speed of v3;

when the pull-over parking test begins and when the to-be-tested vehicle crosses the start-end dual purpose warning line, the to-be-tested vehicle changes lane back to the second lane from the first lane and travels at a constant speed along the second lane at the speed of v4, the control platform sends a pull-over parking instruction to the to-be-tested vehicle when appropriate, and the to-be-tested vehicle completes the pull-over parking operation before the second single purpose test end warning line by itself when appropriate;

the control platform collects the speed, the turn-light operation conditions, and the parking distance from the roadside of the to-be-tested vehicle in real time through the wireless communication unit and analyzes whether the to-be-tested vehicle is qualified or not according to the collected data;

wherein the qualification criteria of the pull-over parking test are specifically: the direction and duration of the vehicle turn-light are correct, the entire vehicle is in the emergency lane, the warning lights can be correctly turned on after entering the emergency lane, the parked vehicle is parallel to the right lane, the operation is completed before the second single purpose test end warning line, the maximum distance is less than or equal to 50 centimeters, and the parking actions are coherent.

As a further limitation, after the pull-over parking test is finished, driving both the to-be-tested vehicle and the reference vehicle into the second adjustment area, and changing the vehicle posture for performing the lane reduction lane change test;

after the to-be-tested vehicle and the reference vehicle enter the second adjusting area, wherein the two vehicles are kept in a side-by-side state, the reference vehicle is located in the first lane and the to-be-tested vehicle is located in the second lane, wherein the reference vehicle is first driven out at the speed of v5 and then the to-be-tested vehicle is driven out at the speed of v5, wherein it has to be ensured that the reference vehicle keep a distance of at least 3 meters from the front or back of the to-be-tested vehicle;

when the reference vehicle crosses the third single purpose test start warning line, the test starts, wherein the reference vehicle and the to-be-tested vehicle reach the speed of v5 before a predetermined distance from the lane reduction sign, wherein the to-be-tested vehicle should switch to the first lane in the automatic driving mode before the lane is actually reduced;

collecting the interval, the speed, and the turn-light operation condition of the to-be-tested vehicle and the reference vehicle in real time through the wireless communication unit and analyzing whether the lane reduction merging test of the to-be-tested vehicle is qualified according to the collected data by the control platform;

the qualification criteria of the lane reduction lane change test are specifically: the direction and duration of the vehicle turn-light are correct, the lane change is completed whether by means of deceleration or acceleration, no collision with the first reference vehicle or affecting the normal driving thereof, and the operation is completed before the third single purpose test end warning line.

As a further limitation, the to-be-tested vehicle uploads the whole-course trajectory information of the vehicle collected by the differential GPS plus inertial guidance navigation device to the control platform, and the control platform analyzes whether the wheelpath of the to-be-tested vehicle is in compliance according to the received data.

As a further limitation, comparing the lane change capabilities of a plurality of to-be-tested vehicles, wherein the comparing content includes time and vehicle operation details;

the time includes an overtaking test single item time, a merging test single item time, a pull-over parking test single item time, and a lane reduction merging test single item time; the vehicle operation details, the pull-over parking roadside distance, the trajectory smooth and steady condition, and require safety officer to take over or not.

Contrasting to the prior art, advantages of the present invention include that:

contrasting to the theoretical data of computer simulation traffic operation software, the test system and method provided by the present invention are closer to the real driving environment, so that the test results thereof can more accurately represent the performance of the to-be-tested vehicle, and the tests are safer with respect the practices on actual roads.

The test system and method provided by the present invention combines all possible scenes on actual roads with respect to lane change performance, including overtaking test, occupancy lane change test, pull-over parking test, and lane reduction lane change test, so that the test is more efficient and coherent, and the test system can be utilized as a standardized scene for testing different autonomous vehicles, so that the testing result can be more prestigious and reliable.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 5 is a perspective view of all test sessions in a test field of the test system for the lane change performance of autonomous vehicle according to embodiment 2 of the present invention.

FIG. 6 is a flow diagram of a test method of overtaking for the lane change performance of autonomous vehicle according to embodiment 3 of the present invention.

FIG. 7 is a flow diagram of a test method of a test method of occupancy lane change for the lane change performance of autonomous vehicle according to embodiment 3 of the present invention.

FIG. 8 is a flow diagram of a test method of pull-over parking for the lane change performance of autonomous vehicle according to embodiment 3 of the present invention.

FIG. 9 is a flow diagram of a test method of lane reduction lane change for the lane change performance of autonomous vehicle according to embodiment 3 of the present invention.

FIG. 13 is a flow diagram of a lane change monitoring method of autonomous vehicle according to the above preferred embodiment of the present invention.

1—reference vehicle; 2—to-be-tested vehicle; 3—first lane; 4—second lane; 5—preparation area; 6—control platform; 7—v2x wireless communication network roadside unit (RSU); 8—laser range finder; 9—front lane reduction sign; 10—first single purpose test start warning line A; 11—first single purpose test end warning line B; 12—first single purpose test start warning line C; 13—start-end dual purpose warning line D; 14—second single purpose test end warning line E; 15—third single purpose test start warning line F; 16—third single purpose test end warning line; 17—first adjustment area; 18—second adjustment area; 19—overtaking test area; 20—merging test area; 21—pull-over parking test area; 22—lane reduction merging test area.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. just indicate relations of direction or position are based on the relations of direction or position shown in the appended drawings, which is only to facilitate descriptions of the present invention and to simplify the descriptions, rather than to indicate or imply that the referred device or element must apply specific direction or to be operated or configured in specific direction. Therefore, the above-mentioned terminologies shall not be interpreted as confine to the present invention.

It is understandable that the term "a" should be understood as "at least one" or "one or more". In other words, in one embodiment, the number of an element can be one and in other embodiment the number of the element can be greater than one. The term "a" is not construed as a limitation of quantity.

Embodiment 1

Figure 1:
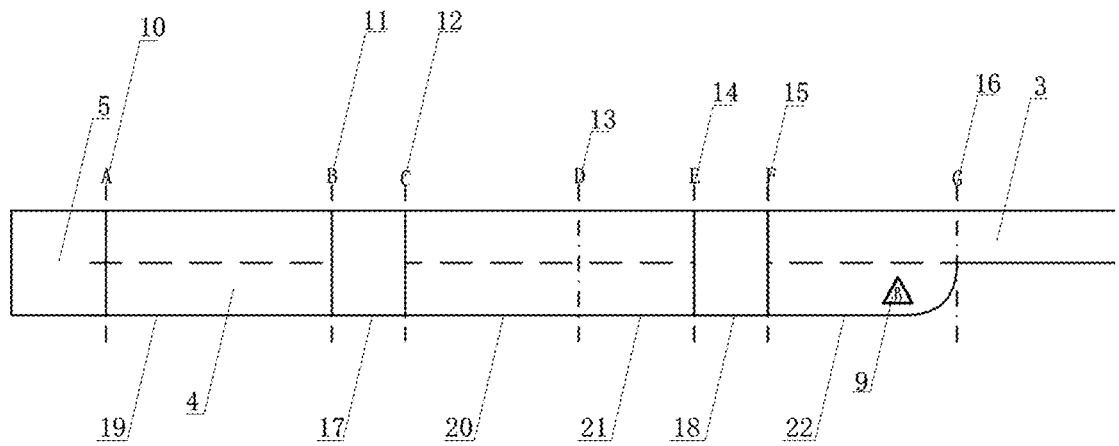
FIG. 1 is a perspective view of a test road for the lane change performance of autonomous vehicle according to embodiment 1 of the present invention.
Figure 2:
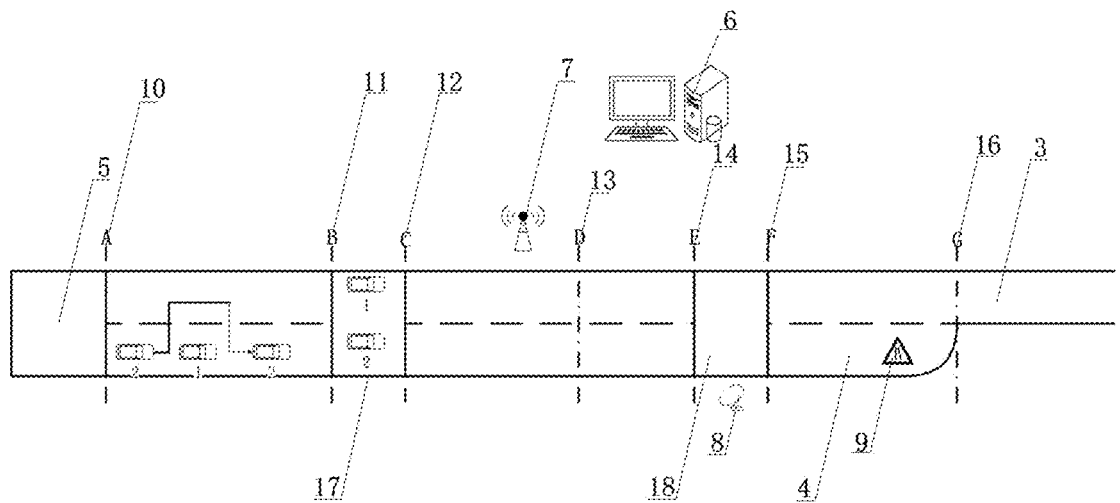
FIG. 2 is a perspective view of overtaking in a test system for the lane change performance of autonomous vehicle according to embodiment 2 of the present invention.
Figure 3:
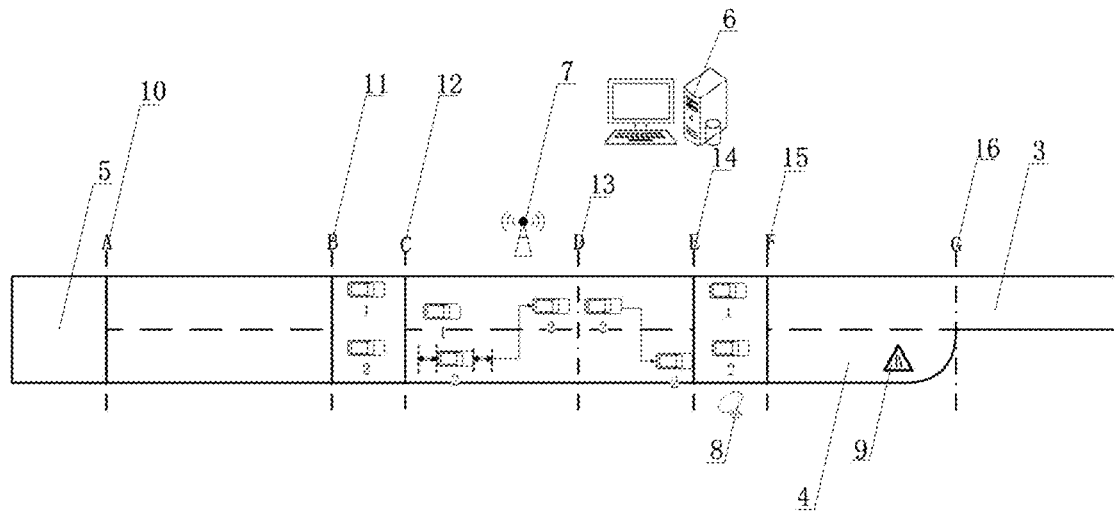
FIG. 3 is a perspective view of occupancy lane change and pull-over parking in the test system for the lane change performance of autonomous vehicle according to embodiment 2 of the present invention.
Figure 4:
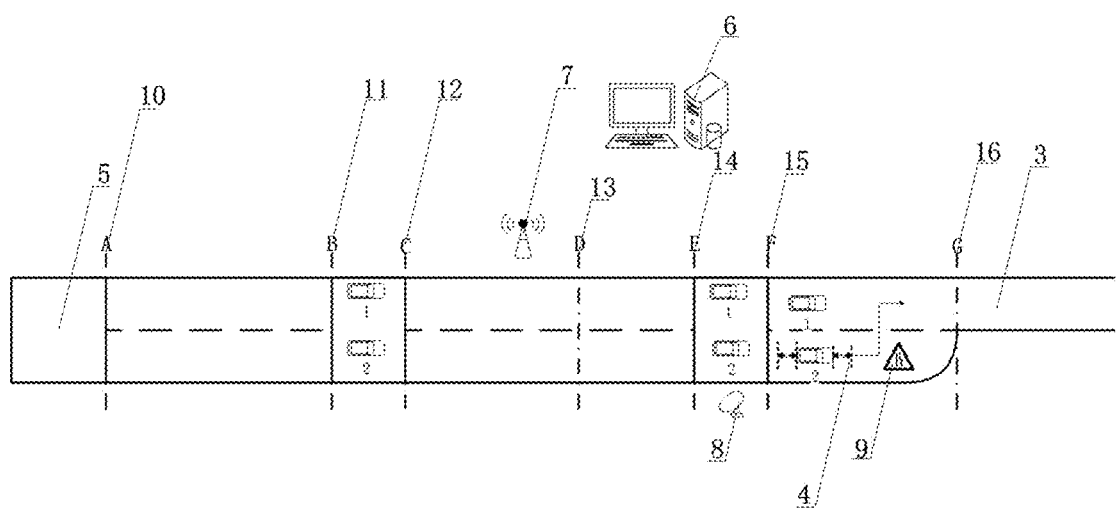
FIG. 4 is a perspective view of lane reduction lane change in the test system for the lane change performance of autonomous vehicle according to embodiment 2 of the present invention.

As shown in FIG. 1, embodiment 1 of the present disclosure provides a test road for lane change performance of autonomous vehicle, comprising two lanes, which are respectively a first lane 3 and a second lane 4, which respectively have seven test warning lines arranged thereon, including three single purpose test start warning lines, three single purpose test end warning lines and a start-end dual purpose warning line, respectively a first single purpose test start warning line A10, a first single purpose test end warning line B11, a first single purpose test start warning line C12, a start-end dual purpose warning line D13, a second single purpose test end warning line E14, a third single purpose test start warning line F15, and a third single purpose test end warning line 16; a lane reduction scene, which is a front lane reduction sign 9, provided by the second lane; a preparation area 5, arranged in the start part of the lanes, adapted for checking the state of the reference vehicle and the to-be-tested vehicle and performing test preparation works; and two adjusting areas, arranged in the middle section of the lanes, which are respectively the first adjusting area 17 and the second adjusting area 18, which are adapted for driving the reference vehicle and the to-be-tested vehicle after the end of a previous test, for adjusting, changing, and maintaining the postures and conditions of the vehicles required by a latter test, wherein the testing road has an overtaking test area 19, a merging test area 20, a pull-over parking test area 21, and a lane reduction merging test area 22, which are utilized for conducting tests of various scenes.

Embodiment 2

Referring to FIGS. 2-5, embodiment 2 of the present invention provides a test system for lane change performance of autonomous vehicle, which comprises a reference vehicle 1, a to-be-tested vehicle 2, a control platform 6, roadside devices, and the test roads as illustrated in embodiment 1, wherein the roadside devices comprises a v2x wireless communication network roadside unit (RSU) 7 and a laser range finder 8 arranged by the roadside, wherein the v2x wireless communication network roadside unit (RSU) 7 is communicatingly connected with the laser range finder 8, the reference vehicle 1, and the to-be-tested vehicle 2, so as for transmitting the driving state data of the reference vehicle 1 and the to-be-tested vehicle 2 and the distance data of the to-be-tested vehicle 2 and the roadside to the control platform, wherein the control platform 6 is utilized for controlling the driving state of the vehicles, and analyzing whether the lane change capability test of the to-be-tested vehicle 2 is qualified or not according to the received data.

The control platform is also utilized to control the speed and lateral position of the reference vehicle in front of or side-by-side of the to-be-tested vehicle.

The lane at least has an overtaking test area, a merging test area, a parking test area, and a lane reduction lane change area arranged thereon, wherein the laser range finder is arranged at the roadside of the parking test area and utilized for detecting the distance from the roadside to to-be-tested vehicle when it parks.

The reference vehicle and the to-be-tested vehicle are each equipped with a wireless communication device employing a V2X communication protocol, for realizing communication between the vehicles, between the vehicle and the control platform, and sending early warning information to the to-be-tested vehicle when the reference vehicle changes the vehicle speed and/or the driving direction to be close to the to-be-tested vehicle, and also being utilized for transmitting the posture, the speed, the trajectory, the time and durations of the on and off and flashing of the turn-light of the to-be-tested vehicle to the control platform.

The to-be-tested vehicle is equipped with a differential GPS plus inertial guidance navigation device for transmitting the whole-course trajectory information of the to-be-tested vehicle to the wireless communication unit via a wireless communication protocol to be uploaded to the control platform.

Embodiment 3

The embodiment 3 of the present invention provides a test method for lane change performance of autonomous vehicle, which includes the methods of overtaking test, occupancy lane change test, pull-over parking test, and lane reduction lane change test.

Referring to FIG. 6, the overtaking test method comprises the steps of:

driving both the reference vehicle and the to-be-tested vehicle into the preparation area, checking the v2x wireless network connections between the reference vehicle and the control platform and between the reference vehicle and the to-be-tested vehicle;

driving the reference vehicle to leave the preparation area and travel on the second lane at the speed of 30 km/h and when traveling smoothly, having the control platform to issue a test start instruction, wherein when the reference vehicle passes the first single purpose test start warning line, it is regarded as the start of the test, wherein the to-be-tested vehicle drives out from the preparation area at the speed of 50 km/h on the second lane in an automatic driving mode and approaches the reference vehicle, wherein the to-be-tested vehicle performs an overtaking action when appropriate; and collecting the interval, the speed, and the turn-light operation condition of the to-be-tested vehicle and the reference vehicle in real time through the v2x wireless communication network roadside unit (RSU) and analyzing whether the overtaking of the to-be-tested vehicle is qualified according to the collected data by the control platform;

wherein the qualification criteria of the overtaking test are specifically: the turn-light operations of the to-be-tested vehicle are correct during the overtaking process, the operation is completed before the first single purpose test end warning line, the driving of the reference vehicle is not affected and no collision occurs, and stays driving in the middle of the lane after the overtaking action.

Referring to FIG. 7, the occupancy lane change monitoring method comprises the steps of:

after the overtaking test is finished, driving both the to-be-tested vehicle and the reference vehicle into the first adjustment area to change the vehicle posture for the occupancy lane change test;

after the to-be-tested vehicle and the reference vehicle enter the first adjusting area, wherein the two vehicles are kept in a side-by-side state, the reference vehicle is located in the first lane and the to-be-tested vehicle is located in the second lane, wherein the reference vehicle is first driven out at the speed of 30 km/h and then the to-be-tested vehicle is driven out at the speed of 30 km/h, wherein it has to be ensured that the reference vehicle keep a distance of at least 3 meters from the front or back of the to-be-tested vehicle;

the test begins when the reference vehicle passes a second single purpose test start warning line, wherein the to-be-tested vehicle smoothly switches from the second lane to the front of the first reference vehicle in the first lane; and collecting the interval, the speed, and the turn-light operation condition of the to-be-tested vehicle and the reference vehicle in real time through the v2x wireless communication network roadside unit (RSU) and analyzing whether the merging of the to-be-tested vehicle is qualified according to the collected data by the control platform;

wherein the qualification criteria of the occupancy lane change test are specifically: the normal traveling of the reference vehicle is not affected and no collision occurs, the directions and durations of the turn-light are correct, and the operation succeeds before the start-end dual purpose warning line.

Referring to FIG. 8, according to the pull-over parking test method, the reference vehicle keeps traveling at a speed of 30 km/h in a first lane until entering a second adjustment zone and the to-be-tested vehicle continues to travel in the middle of the first lane at a speed of 30 km/h;

when the pull-over parking test begins and when the to-be-tested vehicle crosses the start-end dual purpose warning line, the to-be-tested vehicle changes lane back to the second lane from the first lane and travels at a constant speed along the second lane at the speed of 60 km/h (if the max speed of the autonomous vehicle is less than 60 km/h), the control platform sends a pull-over parking instruction to the to-be-tested vehicle when appropriate, and the to-be-tested vehicle completes the pull-over parking operation before the second single purpose test end warning line by itself when appropriate;

the control platform collects the speed, the turn-light operation conditions, and the parking distance from the roadside of the to-be-tested vehicle in real time through the v2x wireless communication network roadside unit (RSU) and analyzes whether the to-be-tested vehicle is qualified or not according to the collected data;

the qualification criteria of the pull-over parking test are specifically: the direction and duration of the vehicle turn-light are correct, the entire vehicle is in the emergency lane, the warning lights can be correctly turned on after entering the emergency lane, the parked vehicle is parallel to the right lane, the operation is completed before the second single purpose test end warning line, the maximum distance is less than or equal to 50 centimeters, and the parking actions are coherent.

Referring to FIG. 9, the lane reduction lane change monitoring method comprises the steps of:

after the pull-over parking test is finished, driving both the to-be-tested vehicle and the reference vehicle into the second adjustment area to change the vehicle posture for the lane reduction lane change test;

after the to-be-tested vehicle and the reference vehicle enter the second adjusting area, wherein the two vehicles are kept in a side-by-side state, the reference vehicle is located in the first lane and the to-be-tested vehicle is located in the second lane, wherein the reference vehicle is first driven out at the speed of 30 km/h and then the to-be-tested vehicle is driven out at the speed of 30 km/h, wherein it has to be ensured that the reference vehicle keep a distance of at least 3 meters from the front or back of the to-be-tested vehicle;

when the reference vehicle crosses the third single purpose test start warning line, the test starts, wherein the reference vehicle and the to-be-tested vehicle reach the speed of 30 km/h before a 100 meters from the lane reduction sign, wherein the to-be-tested vehicle should switch to the first lane in the automatic driving mode before the lane is actually reduced;

collecting the interval, the speed, and the turn-light operation condition of the to-be-tested vehicle and the reference vehicle in real time through the v2x wireless communication network roadside unit (RSU) and analyzing whether the lane reduction merging test of the to-be-tested vehicle is qualified according to the collected data by the control platform;

the qualification criteria of the lane reduction lane change test are specifically: the direction and duration of the vehicle turn-light are correct, the lane change is completed whether by means of deceleration or acceleration, no collision with the first reference vehicle or affecting the normal driving thereof, and the operation is completed before the third single purpose test end warning line.

The to-be-tested vehicle uploads the whole-course trajectory information of the vehicle collected by the differential GPS plus inertial guidance navigation device to the control platform, and the control platform analyzes whether the wheelpath of the to-be-tested vehicle is in compliance according to the received data.

The test method further comprises a correlation index for transversely testing the quality of the lane change capability between different to-be-tested vehicles, wherein the index includes three parts:

(1) Time: the comparison items of "Time" part include "single item time for the overtaking test", "single item time for the merging test", "single item time for the pull-over parking test", "single item time for the lane reduction merging test", and "time for completing the total test".

(2) Distance: the comparison items of "Distance" part include "single item driving distance in the overtaking test", "single item driving distance in the merging test", "single item driving distance in the pull-over parking test", and "single item driving distance in the lane reduction merging test".

(3) Detail Operations of the Vehicle; the comparison items of "Detail Operations of the Vehicle" part includes "turn-light operation", "pull-over parking roadside distance", "trajectory smooth and steady condition", and "require safety officer to take over or not".

The comparison of lane change capabilities of the different to-be-tested vehicles may be compared through the comparison items of the parts, so as to compare the performances of different vehicles.

The comparison of lane change capabilities of different vehicles may be compared through the comparison items and parts in the above table, so as to compare the performances.

Referring to FIGS. 10-13, a lane change monitoring method and lane change monitoring system for autonomous vehicle according to a fourth preferred embodiment of the present invention will be illustrated below. Those are the same with the above preferred embodiment are that the test method and the lane change monitoring system of autonomous vehicle are utilized for testing lane change performance and capabilities of a to-be-tested vehicle 100A with autonomous driving functions. The lane change monitoring system comprises a test road 10A, a control platform 20A, at least a reference vehicle 30A, and a network communication device 40A, wherein the reference vehicle 30A and the to-be-tested vehicle 100A are communicatively connected with the control platform 20A through the network communication device 40A. The control platform 20A sends control instruction(s) to the reference vehicle 30A and the to-be-tested vehicle 100A through the network communication device 40A, so as to control the driving speed, direction, position, and posture and condition of the reference vehicle 30A and the to-be-tested vehicle 100A. The driving state data of the reference vehicle 30A and the to-be-tested vehicle 100A travelling in the test road 10A, such as switch data of the turn-light, travelling speed, distance between the vehicles, and etc., are sent to the control platform 20A through the network communication device 40A. The control platform 20A determines if the lane change performance of the to-be-tested vehicle 100A meet the requirements based on analyzing the test data uploaded through the network communication device 40A.

Figure 10:
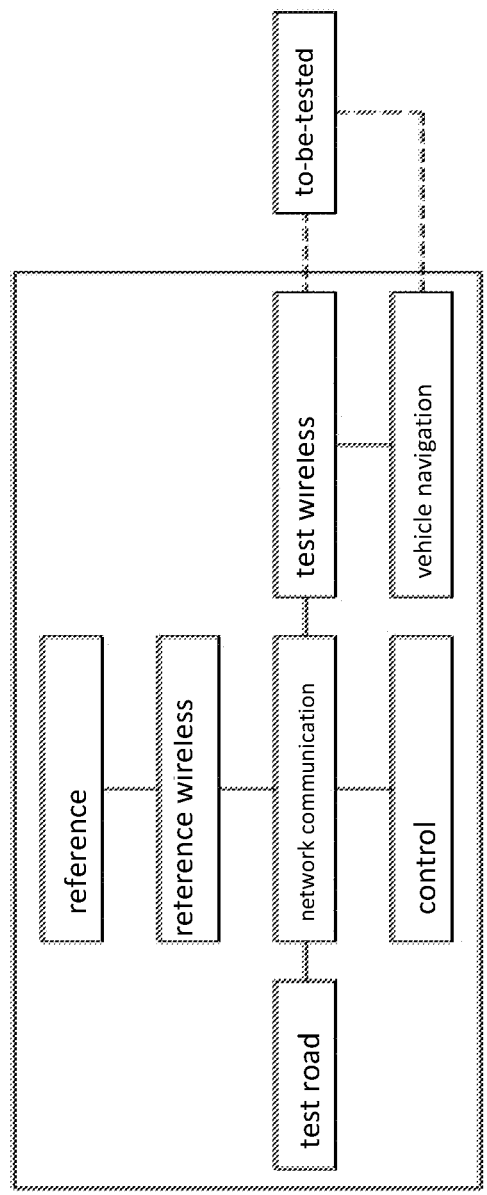
FIG. 10 is a perspective view of a lane change monitoring system according to a fourth preferred embodiment of the present invention.

Referring to FIG. 10, the test road 10A comprises a first lane 11A and a second lane 12A, wherein the first lane 11A is next, according to the preferred embodiment of the present invention, wherein the test road 10A may be, but not limited to, a test road with two lanes. Person skilled in the art should be able to understand that quantity of the lane of the test road 10A here is just an example, rather than limit. According to other embodiments of the present invention, the test road 10A may also be embodied as a road with multiple lanes.

It is worth mentioning that according to the preferred embodiment of the present invention, the to-be-tested vehicle 100A and the reference vehicle 30A are driving on the first lane 11A and the second lane 12A of the test road, wherein the to-be-tested vehicle 100A finishes the lane change test between the first lane 11A and the second lane 12A. The first lane 11A is next to the second lane 12A and the widths of the first lane 11A and the second lane 12A are the same. Preferably, the road surface material of the first lane 11A and the second lane 12A of the test road 10A and the real-world roads are the same, so as to allow the lane change monitoring system to achieve the test data of the vehicles driving on a real road.

For example, in the lane change monitoring method of autonomous vehicle according to the preferred embodiment of the present invention, the reference vehicle 30A is travelling in the first lane 11A of the test road 10A, wherein the to-be-tested vehicle 100A travels and changes lane between the second lane 12A and the first lane 11A of the test road. When the to-be-tested vehicle 100A receives the lane change test control instruction from the control platform 20A, the to-be-tested vehicle 100A changes lane from the second lane 12A to the first lane 11A or from the first lane 11A to the second lane, so as for testing the lane change test performance of the to-be-tested vehicle 100A.

Person skilled in the art should be able to understand that the to-be-tested vehicle 100A receives a lane change test control instruction sent by the control platform 20A through the network communication device 40A and then the to-be-tested vehicle 100A, according to the lane change test instruction, drives in and, when appropriate, switches lane between the first lane 11A and the second lane 12A. All the driving data of the to-be-tested vehicle 100A and the reference vehicle 30A are sent to the control platform 20A through the network communication device 40A, so as to allow the control platform 20A to determine if the to-be-tested vehicle 100A meets the test criteria based on these driving data.

In detail, the lane change test control instruction sent by the control platform 20A comprises an overtaking lane change performance testing instruction, an occupancy lane change performance test instruction, and a pull-over parking performance test instruction.

It is worth mentioning that the to-be-tested vehicle 100A, based on the lane change test control instruction of the control platform 20A, completes the overtaking lane change performance test, the occupancy lane change performance test, the pull-over parking performance test and the lane reduction lane change performance test between the first lane 11A and the second lane 12A of the test road 10A.

The lane change monitoring system tests the lane change capabilities of the to-be-tested vehicle 100A in the conditions of overtaking test, occupancy lane change test, pull-over parking test, and lane reduction lane change test. Correspondingly, the test road 10A further has an overtaking lane change test area 101A, an occupancy lane change test area 102A, a pull-over parking test area 103A, and a lane reduction lane change test area 104A arranged thereon. Preferably, according to the preferred embodiment of the present invention, the overtaking lane change test area 101A, the occupancy lane change test area 102A, the pull-over parking test area 103A, and the lane reduction lane change test area 104A are arranged in order on the test road 10A and the areas are not overlapped. Person skilled in the art should be able to understand that the sequence of the tests to the to-be-tested vehicle 100A through the lane change monitoring system here is just an example, rather than limit. Hence, the test areas of the test road 10A may change based on the change of the sequence of the tests.

The to-be-tested vehicle 100A completes the overtaking lane change performance test in the overtaking lane change test area 101A of the test road 10A, completes the occupancy lane change performance test in the occupancy lane change test area 102A, completes the pull-over parking performance test in the pull-over parking test area 103A, and completes the lane reduction lane change performance test in the lane reduction lane change test area 104A.

Referring to FIG. 10, the test road 10A further has a preparation area 105A, a first adjustment area 106A, and a second adjustment area 107A, wherein the preparation area 105A is located at the initiating terminal or start end of the test road 10A, wherein the to-be-tested vehicle 100A and the reference vehicle 30A are departed from the preparation area 105A. The first adjustment area 106A is located between the overtaking lane change test area 101A and the occupancy lane change test area 102A, wherein the second adjustment area 107A is located between the pull-over parking test area 103A and the lane reduction lane change test area 104A. Preferably, according to the preferred embodiment of the present invention, the occupancy lane change test area 102A is next to the pull-over parking test area 103A. In other words, the to-be-tested vehicle 100A directly drives from the occupancy lane change test area 102A into the pull-over parking test area 103A.

The reference vehicle 30A and the to-be-tested vehicle 100A enter the test area from the preparation area 105A of the test road 10A and their positions, postures and conditions, and distance were adjusted in the preparation area 105A. The reference vehicle 30A and the to-be-tested vehicle 100A further have their postures and conditions, positions, and distance therebetween be adjusted within the first adjustment area 106A and the second adjustment area 107A of the test road 10A, so as to be prepared for the next lane change performance test.

Preferably, according to the preferred embodiment of the present invention, the overtaking lane change performance, occupancy lane change performance, pull-over parking performance, and lane reduction lane change performance of the to-be-tested vehicle 100A are continuously and consecutively tested in the testing in the test road 10A, which highly effectively coheres the testing, simplifies the testing process, and enhances the testing efficiency.

The test road 10A further has an overtaking lane change start line 110A, an overtaking lane change end line 120A, an occupancy lane change start line 130A, a dual purpose test line 140A, a parking lane change end line 150A, a lane reduction test start line 160A, a lane reduction test end line 170A arranged thereon. The overtaking lane change start line 110A is arranged between the overtaking lane change test area 101A and the preparation area 105A. When the reference vehicle 30A or the to-be-tested vehicle 100A pass the overtaking lane change start line 110A and enters the overtaking lane change test area 101A, the overtaking lane change test of the to-be-tested vehicle 100A will begin. The overtaking lane change end line 120A is arranged between the overtaking lane change test area 101A and the first adjustment area 106A. When the to-be-tested vehicle from the overtaking lane change test area 101A passes the overtaking lane change end line, the overtaking lane change test of the to-be-tested vehicle 100A will end. The occupancy lane change start line 130A is formed and provided between the first adjustment area 106A and the occupancy lane change test area 102A, wherein when the reference vehicle 30A or to-be-tested vehicle 100A pass the occupancy lane change start line 130A and enter the occupancy lane change test area 102A, the occupancy lane change test of the to-be-tested vehicle 100A will begin.

The dual purpose test line 140A is provided between the occupancy lane change test area 102A and the pull-over parking test area 103A. When the to-be-tested vehicle from the occupancy lane change test area 102A passes the dual purpose line 140A and arrives the pull-over parking test area 103A, the occupancy lane change test of the to-be-tested vehicle 100A will end and the pull-over parking lane change test of the to-be-tested vehicle 100A will begin. The parking lane change end line 150A is formed between the parking lane change test area 103A and the second adjustment area 107A. When the to-be-tested vehicle 100A from the parking lane change test area 103A passes the parking lane change end line 150A, the parking lane change test of the to-be-tested vehicle 100A will end.

The test road 10A further comprises at least a distance detector 13A, wherein the distance detector 13A is arranged in the vicinity of the pull-over parking test area 103A of the test road 10A, wherein the distance detector 13A is utilized to detect the distance between the to-be-tested vehicle 100A and the roadside when the to-be-tested vehicle 100A is doing the pull-over parking lane change test. Preferably, according to the preferred embodiment, the distance detector 13A is embodied as a laser range finder. Person skilled in the art should be able to understand that specific type of the distance detector 13A here is just an example, rather than limit.

It is worth mentioning that the distance detector 13A is communicatively connected with the network communication device 40A, wherein the distance data information of the to-be-tested vehicle 100A and the roadside detected by the detector 13A is transmitted to the control platform 20A through the network communication device 40A, so as for the control platform 20A to evaluate the lane change parking performance of the to-be-tested vehicle 100A based on the data information of the detection of the distance detector 13A.

The lane reduction test start line 160A is formed and provided between the second adjustment area 107A and the lane reduction lane change test area 104A. When the reference vehicle 30A or the to-be-tested vehicle left from the second adjustment area 107A go over the lane reduction test start line 160A, the lane reduction lane change test of the to-be-tested vehicle 100A begins.

According to this preferred embodiment of the present invention, the test road 10A has a lane reduction scene sign 108A arranged in the lane reduction lane change test area 104A by the second lane 12A, wherein the lane reduction scene sign 108A is utilized to sign that the quantity of the lanes of the test road 10A is about to be reduced. It is worth mentioning that, according to this preferred embodiment of the present invention, the lane reduction scene sign 108A is identified by the to-be-tested vehicle 100A, so as for the to-be-tested vehicle 100A to change lane within the lane reduction lane change test area 104A. In short, the test road 10A has one lane reduced in the end of the lane reduction lane change test area 104A.

The reference vehicle 30A is communicatively connected with the control platform 20A through the network communication device 40A, wherein the control platform 20A controls the driving direction, speed, and lateral position of the reference vehicle 30A. The reference vehicle 30A and the to-be-tested vehicle 100A are communicatively connected with each other. During the testing, the reference vehicle 30A will send early warning information to the to-be-tested vehicle when changing speed and/or driving direction to approach the to-be-tested vehicle 100A. The to-be-tested vehicle 100A is communicatively connected with the control platform 20A through the network communication device 40A, wherein the control platform 20A sends test control instructions to the to-be-tested vehicle 100A through the network communication device 40A, wherein the to-be-tested vehicle 100A conducts the lane change tests based on the control instructions of the control platform 20A. The posture and condition, speed, trajectory, and time and durations of the on and off and flashing of the turn-light of the to-be-tested vehicle 100A are sent to the control platform 20A through the network communication device 40A, so as to allow the control platform 20A to evaluate the lane change performance of the to-be-tested vehicle 100A based on the information of the to-be-tested vehicle 100A. Preferably, according to the preferred embodiment of the present invention, the reference vehicle 30A may be, but not limited to, an autonomous vehicle or the reference vehicle 30A has an autonomous mode.

It is worth mentioning that the reference vehicle 30A, according to the preferred embodiment of the present invention, is also utilized to acquire and collect the distance between the reference vehicle 30A and the to-be-tested vehicle 100A and the posture and condition of the to-be-tested vehicle 100A during the lane change test. All the data information of the to-be-tested vehicle 100A acquired and collected by the reference vehicle 30A is sent to the control platform 20A through the network communication device 40A, so as to allow the control platform to evaluate the lane change performance of the to-be-tested vehicle 100A based on these acquired and collected data of the to-be-tested vehicle 100A. Alternatively, according to other embodiments of the present invention, the distance and vehicle postures and conditions of the reference vehicle 30A and the to-be-tested vehicle 40A may be acquired and obtained through the movement trajectories of the reference vehicle and the to-be-tested vehicle 100A, so as to, in order words, determine the distance or interval between the reference vehicle 30A and the to-be-tested vehicle 100A based on the trajectory information of the reference vehicle 30A and the to-be-tested vehicle 100A respectively.

It is worth mentioning that the lane change monitoring system, according to the preferred embodiment of the present invention, further comprises a reference wireless communication device 50A, a test wireless communication device 60A, and a vehicle navigation device 70A, wherein the reference wireless communication device 50A is loaded on the reference vehicle 30A, wherein the test wireless communication device 60A and the vehicle navigation device 70A are loaded on the to-be-tested vehicle 100A. The reference vehicle 30A is communicatively connected with the test wireless communication device 60A of the to-be-tested vehicle 100A and the network communication device 40A through the reference wireless communication device 50A, so as to utilize the reference wireless communication device 50A to receive all the control instructions of the control platform 20A and to transmit the driving data information of the reference vehicle 30A to the control platform 20A. The test wireless communication device 60A is communicatively connected with the reference wireless communication device 50A and the network communication device 40A, wherein the control platform 20A sends the control instructions to the test wireless communication device 60A through the network communication device 40A. The vehicle data information of the testing of the to-be-tested vehicle 100A is sent to the control platform 20A through the test wireless communication device 60A and the network communication device 40A. The vehicle navigation device 70A is utilized to record the whole-course trajectory information of the to-be-tested vehicle 100A and the detected trajectory information of the vehicle navigation device 70A is transmitted to the control platform 20A through the test wireless communication device 60A and the network communication device 40A, so as for the control platform 20A to evaluate the lane change performance of the to-be-tested vehicle 100A based on the trajectory information.

Person skilled in the art should be able to understand that, according to this preferred embodiment of the present invention, the test wireless communication device 60A and the vehicle navigation device 70A may be loaded and set on the to-be-tested vehicle 100A. Namely, both the test wireless communication device 60A and the vehicle navigation device 70A are carried by the to-be-tested vehicle 100A.

Preferably, according to the preferred embodiment of the present invention, the vehicle navigation device 70A is a navigation device of differential GPS with inertial guidance.

The network communication device 40A is arranged by the side of the test road 10A for receiving and sending all the data information of the reference vehicle 30A and the to-be-tested vehicle 100A as well as receiving and sending all the lane change test control instructions of the control platform 20A. Preferably, according to the preferred embodiment of the present invention, the network communication device 40A is embodied as a wireless communication network roadside unit (RSU) and the network communication device 40A has a V2X (Vehicle to everything) communication protocol. Person skilled in the art should be able to understand that specific type of the network communication device 40A here is just an example, rather than limit. Hence, according to other embodiments of the present invention, the network communication device 40A may also be embodied as other type of wireless communication device.

It is worth mentioning that, according to the preferred embodiment of the present invention, the reference wireless communication device 50A and the test wireless communication device 60A respectively include a V2X communication protocol and a V2V (Vehicle to Vehicle) communication protocol.

According to this preferred embodiment of the present invention, the control platform 20A analyzes if the lane change test of the to-be-tested vehicle 100A is qualified and determines the lane change test performance of the to-be-tested vehicle 100A based on the test data uploaded by the reference vehicle 30A, the to-be-tested vehicle 40A, the distance detector 13A, and etc. For example, the qualification criteria of the overtaking test can be: the turn-light operations of the to-be-tested vehicle 100A are correct during the overtaking process, the operation is completed before the overtaking lane change end line, the driving of the reference vehicle 30A is not affected and no collision occurs, and the to-be-tested vehicle 100A stays driving in the middle of the lane after the overtaking action. The determination criteria are during the lane change process, the to-be-tested vehicle 100A did not affect the normal traveling of the reference vehicle and no collision occurred, the directions and durations of the turn-light were correct, and the operation succeeded before the start-end dual purpose test line 140A. The qualification criteria of the pull-over parking test are: the direction and duration of the turn-light of the to-be-tested vehicle 100A are correct, the entire vehicle is in the emergency lane, the warning lights can be correctly turned on after entering the pull-over parking test area 103A, the parked vehicle is parallel to the right lane, the operation is completed before the pull-over parking test end line 150A, the maximum distance is less than or equal to 50 centimeters, and the parking actions are coherent. The qualification criteria of the lane reduction lane change test are: the direction and duration of the turn-light of the to-be-tested vehicle 100A are correct, the lane change is completed whether by means of deceleration or acceleration, no collision with the reference vehicle 30A or affecting the normal driving thereof, and the operation is completed before the lane reduction test end line 170A.

Figure 11A:
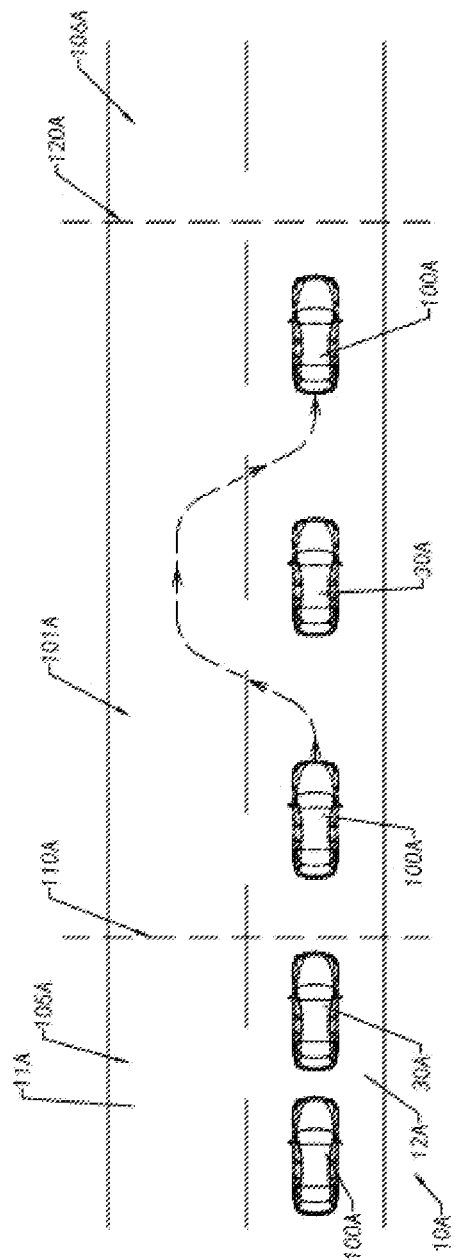
FIGS. 11A-11D are application views of lane changes of to-be-tested autonomous vehicle of the tests of the lane change monitoring system according to the above preferred embodiment of the present invention.
Figure 11B:
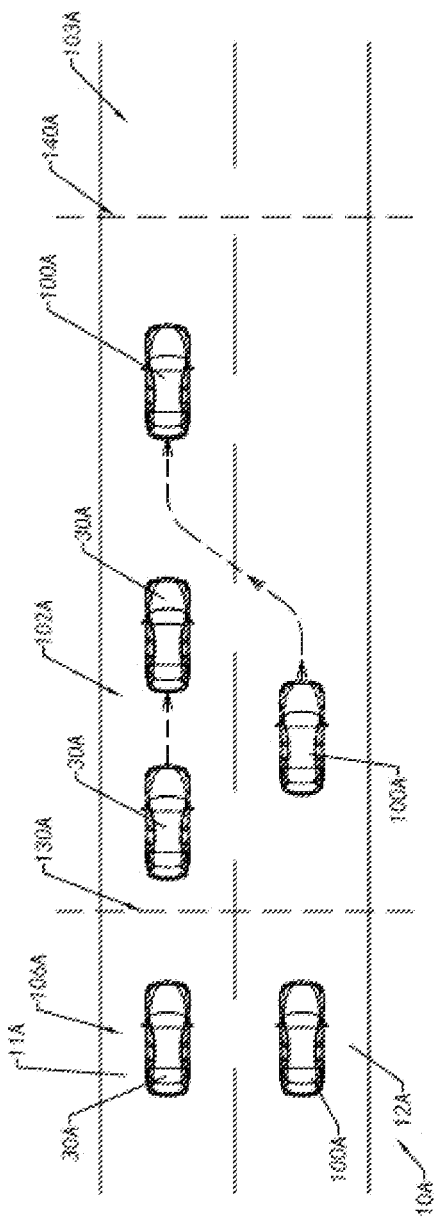
Figure 11C:
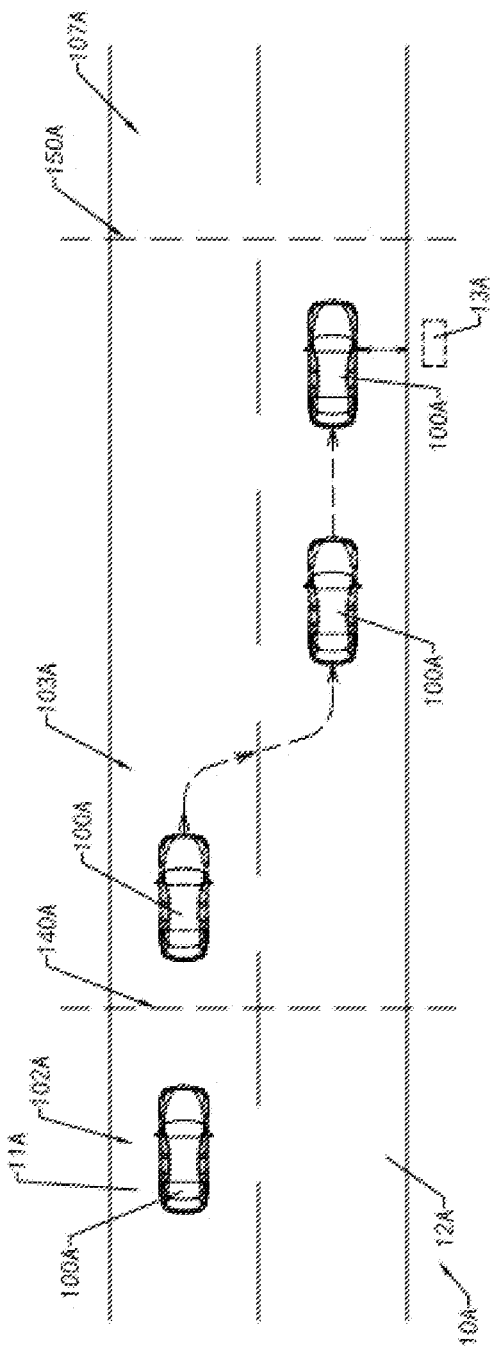
Figure 11D:
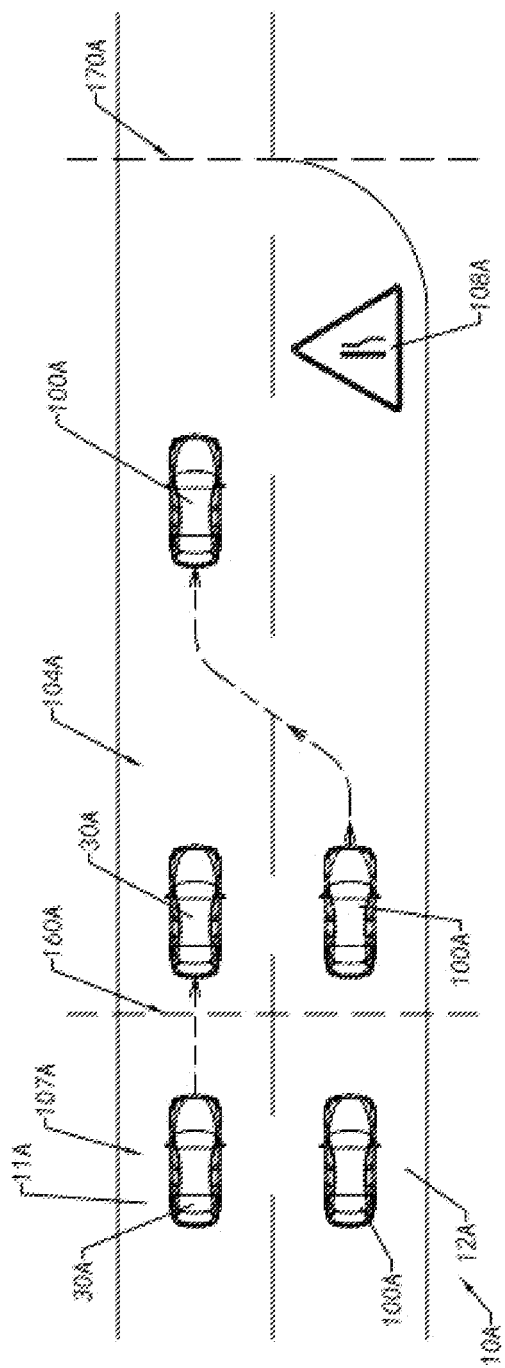
Figure 12:
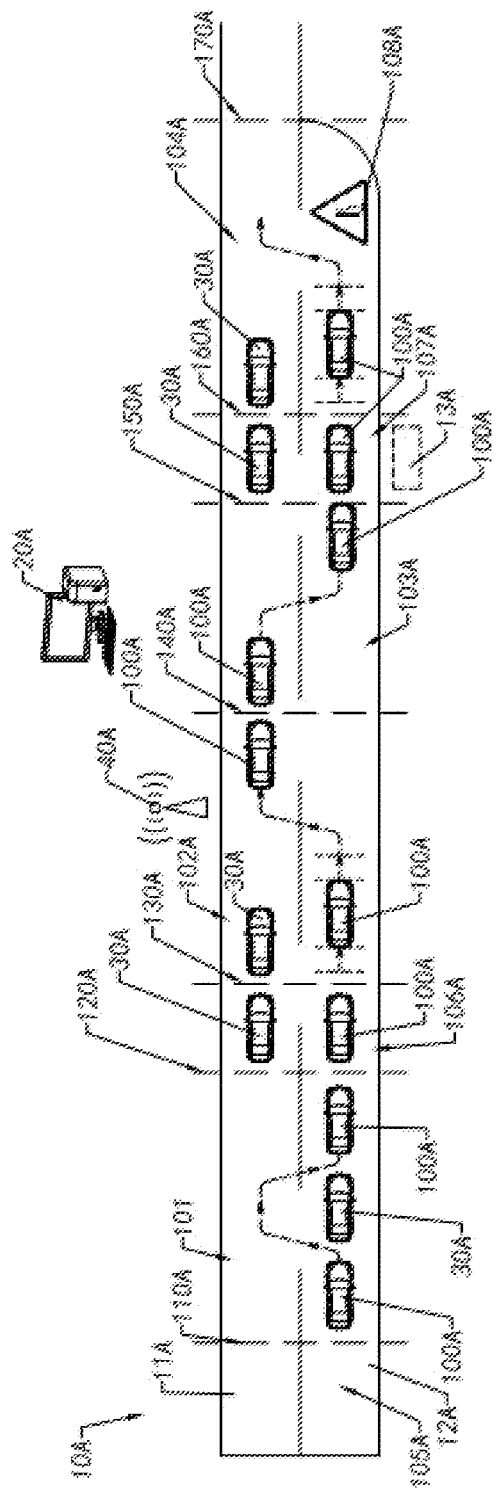
FIG. 12 is an application view of continuous lane changes of a to-be-tested autonomous vehicle of the tests of the lane change monitoring system according to the above preferred embodiment of the present invention.

FIGS. 11A-12 illustrate test methods of lane change performance of autonomous vehicle of the lane change monitoring system according to the above preferred embodiment of the present invention. Specifically speaking, the autonomous vehicle lane change monitoring method specifically comprises: an overtaking lane change monitoring method, an occupancy lane change monitoring method, a pull-over parking lane change monitoring method, and a lane reduction lane change monitoring method.

Before the to-be-tested vehicle 100A enters the test area, the to-be-tested vehicle 100A and the reference vehicle 30A are communicatively connected with each other. The reference vehicle 30A, the to-be-tested vehicle 100A, and the control platform 20A are communicatively connected one another through the network communication device 40A, so as for the control platform 20A to send control instruction(s) to the to-be-tested vehicle 100A and to receive the test data information of the to-be-tested vehicle 100A and the reference vehicle 30A through the network communication device 40A.

Referring to FIG. 11A, the reference vehicle 30A is in the first lane 11A and the to-be-tested vehicle 100A is in the second lane 12A, wherein the control platform 20A controls the reference vehicle 30A to depart from the preparation area 105A and to travel at a speed of v1 in the first lane 11A. After the reference vehicle 30A passes through preparation area 105A and the overtaking lane change start line 110A, the overtaking lane change test of the to-be-tested vehicle 100A begins. The control platform 20A sends overtaking lane change control instruction to the to-be-tested vehicle 100A through the network communication device 40A. After the to-be-tested vehicle 100A receives the overtaking lane change control instruction, the to-be-tested vehicle 100A leaves the preparation area 105A in an autonomous mode in the second lane at a speed of v2 (v2>v1) and approaches the reference vehicle 30A. Then the to-be-tested vehicle 100A executes the overtaking action when appropriate. For example, according to the preferred embodiment of the present invention, the reference vehicle 30A travels at the speed of 30 km/h, wherein the to-be-tested vehicle 100A, based on the control instruction of the control platform 20A, travels at the speed of 50 km/h. Person skilled in the art should be able to understand that, according to this preferred embodiment of the present invention, the travelling speeds of the to-be-tested vehicle 100A and the reference vehicle 30A are only examples and the reference vehicle 30A may also travels at changing speeds, and the to-be-tested vehicle 100A, based on the lane change control instruction, may also travels at a uniform or changing speeds.

The interval, speeds, and turn-light operation conditions of the to-be-tested vehicle 100A and the reference vehicle 30A are sent to the control platform 20A through the network communication device, wherein the control platform 20A utilized the acquired and collected data to determine if the overtaking performance of the to-be-tested vehicle is qualified. The vehicle navigation device 70A uploads the collected whole-course trajectory information of the to-be-tested vehicle 100A to the control platform 20A, wherein the control platform 20A analyzes whether the wheelpath of the to-be-tested vehicle 100A is in compliance according to the received data, so as to analyze the overtaking lane change performance of the to-be-tested vehicle 100A. The qualification criteria of the overtaking test are: the turn-light operations of the to-be-tested vehicle 100A are correct during the overtaking process, the operation is completed before the overtaking lane change end line, the driving of the reference vehicle 30A is not affected and no collision occurs, and the to-be-tested vehicle 100A stays driving in the middle of the lane after the overtaking action.

Referring to FIG. 11B, the to-be-tested vehicle 100A and the reference vehicle 30A enter the first adjustment area 106A, wherein the reference vehicle 30A is in the first lane 11A and the to-be-tested vehicle 100A is in the second lane 12A. The postures and conditions of the to-be-tested vehicle 100A and the reference vehicle 30A are changed within the first adjustment area 106A, so as for conducting the occupancy lane change performance test.

After both the to-be-tested vehicle 100A and the reference vehicle enter the first adjustment area 106A, the vehicles stay is a side-by-side manner. The control platform 20A sends control instruction(s) to the reference vehicle 30A and the to-be-tested vehicle 100A through the network communication device 40A. The reference vehicle 30A and the to-be-tested vehicle 100A successively leave the first adjustment area 106A at a speed of v3. According to the preferred embodiment of the present invention, the reference vehicle 30A and the to-be-tested vehicle 100A keep a distance of 3 meters from each other when leaving the first adjustment area 106A.

After the reference vehicle 30A passes the occupancy lane change test start line, the test begins. The control platform 20A sends an occupancy lane change control instruction to the to-be-tested vehicle 100A through the network communication device 40A. The to-be-tested vehicle 100A, according to the occupancy lane change control instruction of the control platform 20A, switches from the second lane 12A to the first lane 11A when appropriate.

The interval, speeds, and turn-light operation conditions of the to-be-tested vehicle 100A and the reference vehicle 30A are sent to the control platform 20A through the network communication device, wherein the control platform 20A utilized the acquired and collected data to determine if the occupancy lane change performance of the to-be-tested vehicle is qualified. The vehicle navigation device 70A uploads the collected whole-course trajectory information of the to-be-tested vehicle 100A to the control platform 20A, wherein the control platform 20A analyzes whether the wheelpath of the to-be-tested vehicle 100A is in compliance according to the received data, so as to analyze the occupancy lane change performance of the to-be-tested vehicle 100A. The determination criteria are during the lane change process, the to-be-tested vehicle 100A did not affect the normal traveling of the reference vehicle and no collision occurred, the directions and durations of the turn-light were correct, and the operation succeeded before the start-end dual purpose test line 140A.

Referring to FIG. 11C, after the to-be-tested vehicle 100A has gone over the dual purpose test line 140A, the parking lane change test of the to-be-tested vehicle 100A starts, wherein the reference vehicle in the first lane 11A maintains its condition travelling at a speed of v3 until it enters the second adjustment area 107A, wherein the to-be-tested vehicle 100A continues to travel in the middle of the first lane at a speed of v3. The to-be-tested vehicle 100A travels in the first lane 11A, wherein the control platform 20A sends a parking lane change control instruction to the to-be-tested vehicle 100A through the network communication device 40A. The to-be-tested vehicle 100A maintains traveling at a speed of v4 and, based on the parking lane change control instruction, changes from the first lane 11A to the second lane 12A when appropriate. For example, according to the preferred embodiment of the present invention, in the parking lane change test, the travelling speed of the to-be-tested vehicle 100A is 60 km/h. It is understandable that the travelling speeds of the to-be-tested vehicle 100A and the reference vehicle 30A here are just examples, rather than limits.

The to-be-tested vehicle 100A, according to the parking lane change control instruction of the control platform 20A, drives at a uniform speed in the second lane 12A and conducts the pull-over parking when appropriate. The interval, speeds, and turn-light operation conditions of the to-be-tested vehicle 100A and the reference vehicle 30A are sent to the control platform 20A through the network communication device, wherein the control platform 20A utilized the acquired and collected data to determine if the parking lane change performance of the to-be-tested vehicle is qualified. The vehicle navigation device 70A uploads the collected whole-course trajectory information of the to-be-tested vehicle 100A to the control platform 20A, wherein the control platform 20A analyzes whether the wheelpath of the to-be-tested vehicle 100A is in compliance according to the received data, so as to analyze the parking lane change performance of the to-be-tested vehicle 100A. After the to-be-tested vehicle 100A has parked, the distance detector 13A detects the distance between the to-be-tested vehicle 100A and the roadside, wherein the detection data information of the distance detector 13A will be transmitted to the control platform 20A. The qualification criteria of the pull-over parking test are: the direction and duration of the turn-light of the to-be-tested vehicle 100A are correct, the entire vehicle is in the emergency lane, the warning lights can be correctly turned on after entering the pull-over parking test area 103A, the parked vehicle is parallel to the right lane, the operation is completed before the pull-over parking test end line 150A, the maximum distance is less than or equal to 50 centimeters, and the parking actions are coherent.

Referring to FIG. 11D, the reference vehicle 30A and the to-be-tested vehicle 100A enter the second adjustment area 107A to change their vehicle postures for conducting the lane reduction lane change test. After the to-be-tested vehicle 30A and the reference vehicle 100A enter the second adjustment area 107A, the two vehicles stay in a side-by-side manner, wherein the reference vehicle 30A is in the first lane 11A and the to-be-tested vehicle 100A is in the second lane 12A.

The control platform 20A sends control instruction to the reference vehicle 30A and the to-be-tested vehicle 100A through the network communication device 40A, so as for the reference vehicle 30A and the to-be-tested vehicle 100A to, based on the control instruction, respectively depart from the second adjustment area 107A at a speed of v5. It is worth mentioning that when departing from the second adjustment area 107A, the distance between the reference vehicle 30A and the to-be-tested vehicle 100A is longer than 3 meters.

The test starts when the reference vehicle 30A goes over lane reduction test start line 160A, wherein the to-be-tested vehicle 100A runs in the autonomous mode in the second lane 12A. The to-be-tested vehicle in the second lane 12A detects the lane reduction scene sign 108A and then switches from the second lane 12A to run in the first lane 11A when appropriate.

The interval, speeds, and turn-light operation conditions of the to-be-tested vehicle 100A and the reference vehicle 30A are sent to the control platform 20A through the network communication device, wherein the control platform 20A utilized the acquired and collected data to determine if the lane reduction lane change performance of the to-be-tested vehicle is qualified. The vehicle navigation device 70A uploads the collected whole-course trajectory information of the to-be-tested vehicle 100A to the control platform 20A, wherein the control platform 20A analyzes whether the wheelpath of the to-be-tested vehicle 100A is in compliance according to the received data, so as to analyze the lane reduction lane change performance of the to-be-tested vehicle 100A. The qualification criteria of the lane reduction lane change test are: the direction and duration of the turn-light of the to-be-tested vehicle 100A are correct, the lane change is completed whether by means of deceleration or acceleration, no collision with the reference vehicle 30A or affecting the normal driving thereof, and the operation is completed before the lane reduction test end line 170A.

Referring to FIG. 13, according to another aspect of the present invention, the present invention further provides a lane change monitoring method for autonomous vehicle, adapted for testing lane change performance of a to-be-tested vehicle 100A, wherein the lane change monitoring method comprises the following steps:

(a) communicatively connecting the to-be-tested vehicle 100A with a reference vehicle 30A, and communicatively connecting the to-be-tested vehicle 100A with a network communication device 40A, so that the network communication device 40A receives driving data of the reference vehicle 30A and the to-be-tested vehicle 100A, and sends a control instruction of a control platform 20A to the to-be-tested vehicle 100A and the reference vehicle 30A;

(b) sending a lane change control instruction to the to-be-tested vehicle 100A, wherein the reference vehicle 30A the reference vehicle 30A is driven on a first lane 11A of the test road based on the control instruction of the control platform 20A for the to-be-tested vehicle 100A to change lane, when appropriate, on a second lane 12A and the first lane 11A of the test road 10A based on the lane change control instruction; and (c) collecting the interval, the speed and the turn-light operation condition of the to-be-tested vehicle 100A and the reference vehicle 30A, and analyzing the lane change performance of the to-be-tested vehicle 100A.

According to the above lane change monitoring method of the present invention, wherein the step (b) of the lane change monitoring method further comprises: a step (b.1): sending an overtaking lane change control instruction to the to-be-tested vehicle 100A, wherein the reference vehicle 30A is traveling in the first lane 11A in speed of v1, wherein the to-be-tested vehicle 100A is traveling in the second lane 12A in speed of v2 based on the overtaking lane change control instruction and the changes from the second lane 12A to the first lane 11A when appropriate to complete the overtaking.

In the step (c) of the above lane change monitoring method, the qualification criteria of the overtaking test of the to-be-tested vehicle 100A are: the turn-light operations of the to-be-tested vehicle 100A are correct during the overtaking process, the operation is completed before the overtaking lane change end line, the driving of the reference vehicle 30A is not affected and no collision occurs, and the to-be-tested vehicle 100A stays driving in the middle of the lane after the overtaking action.

According to the above lane change monitoring method of the present invention, wherein the step (b) of the lane change monitoring method further comprises: a step (b.2): sending an occupancy lane change control instruction to the to-be-tested vehicle 100A, wherein the reference vehicle 30A is traveling in the first lane 11A, wherein the to-be-tested vehicle 100A is traveling in the second lane 12A based on the overtaking lane change control instruction and the changes from the second lane 12A to the first lane 11A when appropriate to complete the occupancy lane change.

In the step (c) of the above lane change monitoring method, the determination criteria are during the lane change process, the to-be-tested vehicle 100A did not affect the normal traveling of the reference vehicle and no collision occurred, the directions and durations of the turn-light were correct, and the operation succeeded before the start-end dual purpose test line 140A.

According to the above lane change monitoring method of the present invention, the step (b) of the lane change monitoring method further comprises: a step (b.3): sending an pull-over parking lane change control instruction to the to-be-tested vehicle 100A, wherein the reference vehicle 30A is traveling at a speed of v3 in the first lane 11A, wherein the to-be-tested vehicle 100A is traveling at a speed of v4 in the first lane 11A and change to the second lane 12A when appropriate, based on the pull-over parking lane change control instruction, so as to complete the pull-over parking.

In the step (c) of the above lane change monitoring method, the distance between the to-be-tested vehicle 100A and the roadside is detected, wherein the qualification criteria of the pull-over parking test are: the direction and duration of the turn-light of the to-be-tested vehicle 100A are correct, the entire vehicle is in the emergency lane, the warning lights can be correctly turned on after entering the pull-over parking test area 103A, the parked vehicle is parallel to the right lane, the operation is completed before the pull-over parking test end line 150A, the maximum distance is less than or equal to 50 centimeters, and the parking actions are coherent.

According to the above lane change monitoring method of the present invention, the step (b) of the lane change monitoring method further comprises a step (b.4):

sending a control instruction to the reference vehicle 30A and the to-be-tested vehicle 100A, wherein the reference vehicle 30A is traveling in the first lane 11A and the to-be-tested vehicle 100A is traveling in the second lane 12A; and setting a lane reduction scene sign 108A by the second lane 12A for the to-be-tested vehicle 100A to detect the lane reduction scene sign 108A and change from the second lane 12A to the first lane 11A to complete a lane reduction lane change.

In the step (c) of the above lane change monitoring method, the qualification criteria of the lane reduction lane change test are: the direction and duration of the turn-light of the to-be-tested vehicle 100A are correct, the lane change is completed whether by means of deceleration or acceleration, no collision with the reference vehicle 30A or affecting the normal driving thereof, and the operation is completed before the lane reduction test end line 170A.

According to the above lane change monitoring method of the present invention, the lane change monitoring method further comprises the step of: (d) uploading the collected whole-course trajectory information of the to-be-tested vehicle 100A to the control platform 20A, wherein the control platform 20A analyzes whether the wheelpath of the to-be-tested vehicle 100A is in compliance according to the received data, so as to analyze the lane change performance of the to-be-tested vehicle 100A.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A lane change monitoring system, adapted to test a to-be-tested vehicle, comprising:
   at least a reference vehicle, adapted to be communicatively connected with the to-be-tested vehicle;
   a test road for the reference vehicle and the to-be-tested vehicle to travel thereon;
   a wireless communication device, wherein the reference vehicle is communicatively connected with the wireless communication device, wherein the wireless communication device, is adapted to be communicatively connected with the test vehicle; and
   a control platform, wherein the control platform is communicatively connected with the wireless communication device, wherein the control platform sends a control instruction to the reference vehicle and the to-be-tested vehicle through the wireless communication device for the to-be-tested vehicle to change lane on the test road channel when appropriate, wherein the driving data of the to-be-tested vehicle is transmitted to the control platform through the wireless communication device, so as for the control platform to evaluate a lane change performance of the to-be-tested vehicle based on the driving data;
   wherein the test road comprises a first lane and a second lane, the first lane and the second lane respectively comprise seven test warning lines arranged thereon, the seven test warning lines comprise a first single purpose test start warning line, a second single purpose test end warning line, a first single purpose test start warning line, a start-end dual-purpose warning line, a second single purpose test end warning line, a third single purpose test start warning line, and a third single purpose test end warning line; and
   the control platform sends an overtaking lane change performance testing instruction to the testing vehicle through the wireless communication device for the testing vehicle to change lane within an overtaking lane change test area according to the overtaking lane change performance testing instruction, so as for the control platform to evaluate an overtaking lane change performance of the to-be-tested vehicle, wherein the overtaking lane change test area is provided on the test road and defined between the first single purpose test start warning line and the first single purpose test end warning line.

2. The lane change monitoring system, as recited in claim 1, wherein an occupancy lane change test area is provided on the test road and defined between the second single purpose test start warning line and the start-end dual-purpose warning line, wherein the control platform sends an occupancy lane change performance test instruction to the test vehicle through the wireless communication device for the test vehicle to change lane on the occupancy lane change test area according to the occupancy lane change performance test instruction, so as for the control platform to evaluate an occupancy lane change performance of the to-be-tested vehicle.

3. The lane change monitoring system, as recited in claim 2, wherein a pull-over parking test area is provided on the test road and defined between the start-end dual-purpose warning line and the second single purpose test end warning line, wherein the control platform sends a pull-over parking performance test instruction to the test vehicle through the wireless communication device for the test vehicle to change lane in said pull-over parking test area according to the pull-over parking performance test instruction, so as for the control platform to evaluate a pull-over parking lane change performance of the to-be-tested vehicle.

4. The lane change monitoring system, as recited in claim 3, wherein a lane reduction lane change test area is provided on the test road and defined between the third single purpose test start warning line and the third single purpose test end warning line, wherein the test road further has a lane reduction scene sign arranged thereon, wherein the lane reduction scene sign is arranged by the second lane, so as for the to-be-tested vehicle to identify said lane reduction scene sign and change lane from the second lane to the first lane, for the evaluation of a lane reduction lane change performance of the to-be-tested vehicle.

5. The lane change monitoring system, as recited in claim 3, wherein the test road further comprises a distance detector, disposed adjacent to the pull-over parking test area of the test road, wherein the distance detector is communicatively connected with the wireless communication device.

6. The lane change monitoring system, as recited in claim 1, wherein the reference vehicle has an autonomous driving mode.

7. The lane change monitoring system, as recited in claim 1, further comprising a vehicle navigation device, mounted on the to-be-tested vehicle, wherein the vehicle navigation device records whole-course trajectory information of the to-be-tested vehicle.

8. The lane change monitoring system, as recited in claim 1, wherein the wireless communication device is a wireless communication network roadside unit.

9. The lane change monitoring system, as recited in claim 4, wherein the test road further has a preparation area, a first adjustment area, and a second adjustment area, wherein the preparation area is disposed at a start end of the overtaking lane change test area, the first adjustment area is disposed between the overtaking lane change test area and the occupancy lane change test area, and the second adjustment area is disposed between the pull-over parking test area and the lane reduction lane change test area.

10. A lane change monitoring method for autonomous vehicle, adapted for a testing lane change performance of a to-be-tested vehicle, comprising the following steps:
   (a) communicatively connecting the to-be-tested vehicle with a reference vehicle, and communicatively connecting the to-be-tested vehicle with a wireless communication device, so that the wireless communication device receives driving data of the reference vehicle and the to-be-tested vehicle, and sends a control instruction of a control platform to the to-be-tested vehicle and the reference vehicle;

(b) sending a lane change control instruction to the to-be-tested vehicle, wherein the reference vehicle is driven on a first lane of a test road based on the control instruction of the control platform for the to-be-tested vehicle to change lane, when appropriate, on a second lane and the first lane of the test road based on the lane change control instruction;

(c) collecting an interval between the to-be-tested vehicle and the reference vehicle, and a speed and a turn-light operation condition of the to-be-tested vehicle, and analyzing the lane change performance of the to-be-tested vehicle; and (d) uploading collected whole-course trajectory data of the to-be-tested vehicle to the control platform, wherein the control platform analyzes whether a wheel path of the to-be-tested vehicle is in compliance according to the collected data, so as to analyze the lane change performance of the to-be-tested vehicle;

wherein the control platform further analyzes if a lane change test of the to-be-tested vehicle is qualified based on a qualification criteria and determines the lane change performance of the to-be-tested vehicle based on test data uploaded by the reference vehicle, and a to-be-tested vehicle, the distance detector;

wherein the qualification criterion of an overtaking test comprises the followings: an operation of turn-light of the to-be-tested vehicle is correct during the overtaking, the overtaking is completed before a first single purpose test end warning line, a normal driving of the reference vehicle is not affected and no collision occurs, and the to-be-tested vehicle stays driving in a middle of the first lane after the overtaking is completed, wherein a determination criteria of the lane change performance comprises the followings: the to-be-tested vehicle does not affect the normal traveling of the reference vehicle and no collision occurred, a turn direction the turn-light indicates and a duration the turn-light operates are correct, and the to-be-tested vehicle succeeded in changing lanes before a start-end dual-purpose warning line;

wherein the qualification criterion of a pull-over parking test comprises the followings: the turn direction indicated by the turn-light of the to-be-tested vehicle and the duration the turn-light operates are correct, an entire body of the to-be-tested vehicle is in the second lane, a warning light of the to-be-tested vehicle is correctly turned on after entering a pull-over parking test area, the to-be-tested vehicle parked parallel to the second lane, the pull-over parking is completed before a second single purpose test end warning line, a maximum distance between the to-be-tested vehicle and an edge of the test road is less than or equal to 50 centimeters, and actions of the pull-over parking are coherent;

wherein the qualification criterion of a lane reduction lane change test comprises the followings: the turn direction indicated by the turn-light of the to-be-tested vehicle and the duration the turn-light operates are correct, the lane change is completed whether by means of deceleration or acceleration, no collision with the reference vehicle or affecting the normal driving thereof, and the lane change is completed before a third single purpose test end warning line;

wherein the step (b) of the lane change monitoring method further comprises a step of:

(b.1) sending an overtaking lane change control instruction to the to-be-tested vehicle, wherein the reference vehicle is traveling at a speed of y1 in the first lane, wherein the to-be-tested vehicle is traveling at a speed of v2 (v2>v1) in the second lane based on the overtaking lane change control instruction and changes from the second lane to the first lane when appropriate to complete the overtaking.

11. The lane change monitoring method, as recited in claim 10, wherein the step (b) of the lane change monitoring method further comprises a step of:

(b.2) sending an occupancy lane change control instruction to the to-be-tested vehicle, wherein the reference vehicle is traveling in the first lane, wherein the to-be-tested vehicle is traveling in the second lane based on the overtaking lane change control instruction and changes from the second lane to the first lane when appropriate to complete the occupancy lane change.

12. The lane change monitoring method, as recited in claim 11, wherein the step (b) of the lane change monitoring method further comprises a step of:

(b.3) sending a pull-over parking lane change control instruction to the to-be-tested vehicle, wherein the reference vehicle is traveling at a speed of v3 in the first lane 11A, wherein the to-be-tested vehicle is traveling at a speed of v4 in the first lane and change to the second lane when appropriate, based on the pull-over parking lane change control instruction, so as to complete the pull-over parking.

13. The lane change monitoring method, as recited in claim 12, wherein the step (b) of the lane change monitoring method further comprises a step of:

(b.4) sending a control instruction to the reference vehicle and the to-be-tested vehicle, wherein the reference vehicle is traveling in the first lane and the to-be-tested vehicle is traveling in the second lane; and setting a lane reduction scene sign by the second lane for the to-be-tested vehicle to detect the lane reduction scene sign and to change from the second lane to the first lane to complete a lane reduction lane change.

14. The lane change monitoring method, as recited in claim 10, wherein the step (d) further comprising:

uploading collected whole-course trajectory information of the to-be-tested vehicle to the control platform, wherein the control platform analyzes whether a wheel path of the to-be-tested vehicle is in compliance according to the received data, so as to analyze the lane change performance of the to-be-tested vehicle.

* * * * *